(12) United States Patent
Li et al.

(10) Patent No.: US 7,984,561 B2
(45) Date of Patent: Jul. 26, 2011

(54) DEVICE FOR DETERMINING DIMENSION OF A WORKPIECE

(75) Inventors: Lei Li, Shenzhen (CN); Ji-Wen Yang, Shenzhen (CN); Yan-Xin Yu, Shenzhen (CN); Lin-Sen Dong, Shenzhen (CN); Ping Chen, Shenzhen (CN); Zhi Cheng, Shenzhen (CN); Chang-Fa Sun, Shenzhen (CN); Li-Ping Yang, Shenzhen (CN); Li Chang, Shenzhen (CN)

(73) Assignees: Shenzhen Futaihong Precision Industry Co., Ltd., ShenZhen, Guangdong Province (CN); FIH (Hing Kong) Limted, Kowloon (HK)

( * ) Notice: Subject to any disclaimer, the term of this patent is extended or adjusted under 35 U.S.C. 154(b) by 315 days.

(21) Appl. No.: 12/399,224

(22) Filed: Mar. 6, 2009

(65) Prior Publication Data

US 2009/0248354 A1    Oct. 1, 2009

(30) Foreign Application Priority Data

Apr. 1, 2008   (CN) .......................... 2008 1 0300811

(51) Int. Cl.
*G01B 11/24* (2006.01)

(52) U.S. Cl. ..................................... 33/551; 33/DIG. 21

(58) Field of Classification Search .................... 33/546, 33/547, 548, 549, 551, 832, 833, DIG. 21
See application file for complete search history.

(56) References Cited

U.S. PATENT DOCUMENTS

| | | | |
|---|---|---|---|
| 5,129,152 A * | 7/1992 | Barr | 33/832 |
| 7,266,898 B2 * | 9/2007 | El-Katcha et al. | 33/DIG. 21 |
| 2002/0104231 A1 * | 8/2002 | Tominaga et al. | 33/DIG. 21 |
| 2002/0152625 A1 * | 10/2002 | Kushibiki et al. | 33/832 |
| 2008/0216336 A1 * | 9/2008 | Wood et al. | 33/551 |
| 2009/0100695 A1 * | 4/2009 | Muellner | 33/832 |
| 2010/0139107 A1 * | 6/2010 | Koinuma et al. | 33/551 |

* cited by examiner

*Primary Examiner* — G. Bradley Bennett
(74) *Attorney, Agent, or Firm* — Steven M. Reiss

(57) ABSTRACT

A device for determining dimensions of a workpiece includes a locating apparatus, a determining apparatus and a main processor. The locating apparatus includes a locating board supporting workpieces and defining at least one detecting aperture therethrough. The determining apparatus includes a detecting module, the detecting module includes at least one laser detector, each laser detector includes a laser emitter and a laser receiver respectively mounted on two opposite sides of the locating board. The main processor is connected to the locating apparatus and the determining apparatus, the laser emitter emits laser beams traveling through the detecting aperture and received by the laser receiver, and the main processor determines the dimension of the workpiece according to the dimension of parts on the laser receiver shielded by the workpiece.

10 Claims, 4 Drawing Sheets

DEVICE FOR DETERMINING DIMENSION OF A WORKPIECE

BACKGROUND

1. Field of the Invention

The present disclosure relates to a device for determining dimensions of a workpiece, and particularly to a device for determining dimensions of a workpiece without having to contact the workpiece.

2. Description of Related Art

Dimensions of many workpieces require determining. At present, simplified dimension determining tools (for example, vernier calipers and micrometers), and complicated determining apparatuses (for example, three-dimensional determining apparatuses or image detecting apparatuses), are all widely used to measure dimensions of workpieces.

In the dimension determining process, most dimension determining tools or apparatuses require contact with or are pressed towards workpieces. Therefore, surfaces or shapes of the workpieces may be damaged.

Therefore, there is room for improvement within the art.

BRIEF DESCRIPTION OF THE DRAWINGS

Many aspects of the present device for determining dimension of a workpiece can be better understood with reference to the following drawings. The components in the various drawings are not necessarily drawn to scale, the emphasis instead being placed upon clearly illustrating the principles of the present device. Moreover, in the drawings, like reference numerals designate corresponding parts throughout the figures.

DETAILED DESCRIPTION OF THE EXEMPLARY EMBODIMENT

Figure 1:
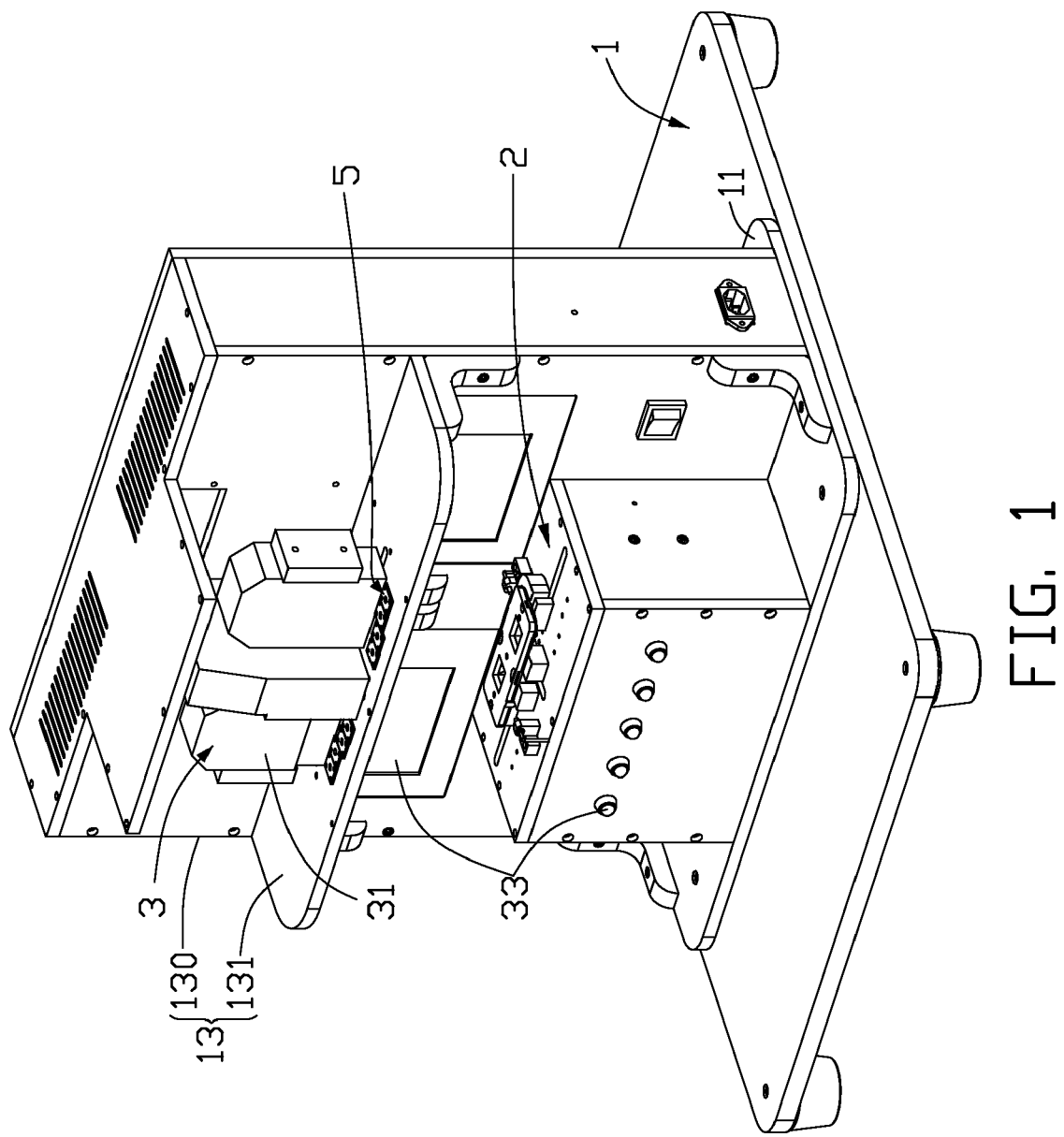
FIG. 1 is an assembled view of a device for determining dimensions of a workpiece, according to an exemplary embodiment.
Figure 4:
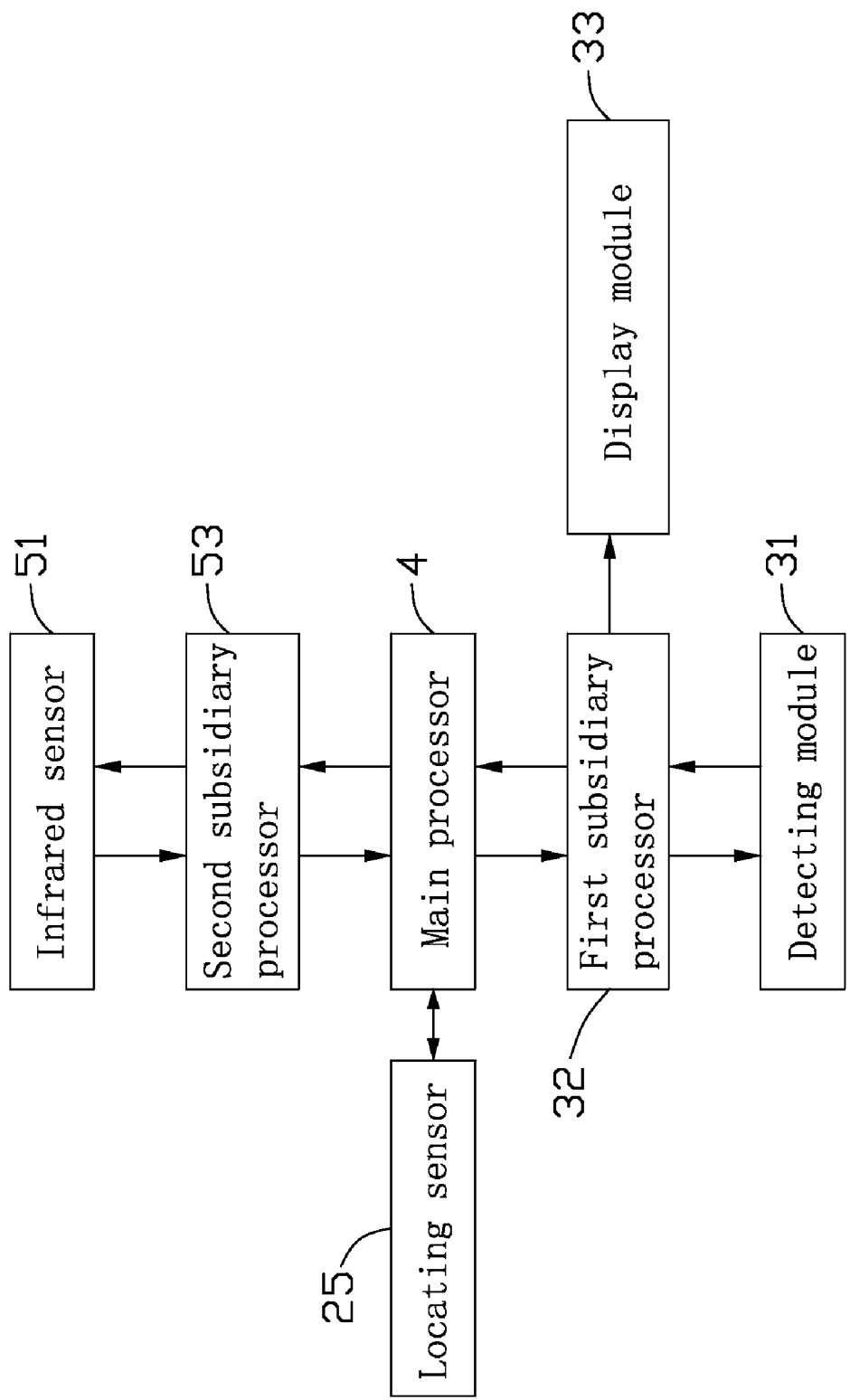
FIG. 4 is a diagram of functional modules of the device shown in FIG. 1.

Referring to FIG. 1 and FIG. 4, a device 100 for determining dimensions of workpieces, according to an exemplary embodiment, is shown. The device 100 includes a housing 1, a locating apparatus 2, a determining apparatus 3, a main processor 4 and a protecting apparatus 5. The locating apparatus 2, the determining apparatus 3, the main processor 4 and the protecting apparatus 5 are all assembled to the housing 1.

Figure 2:
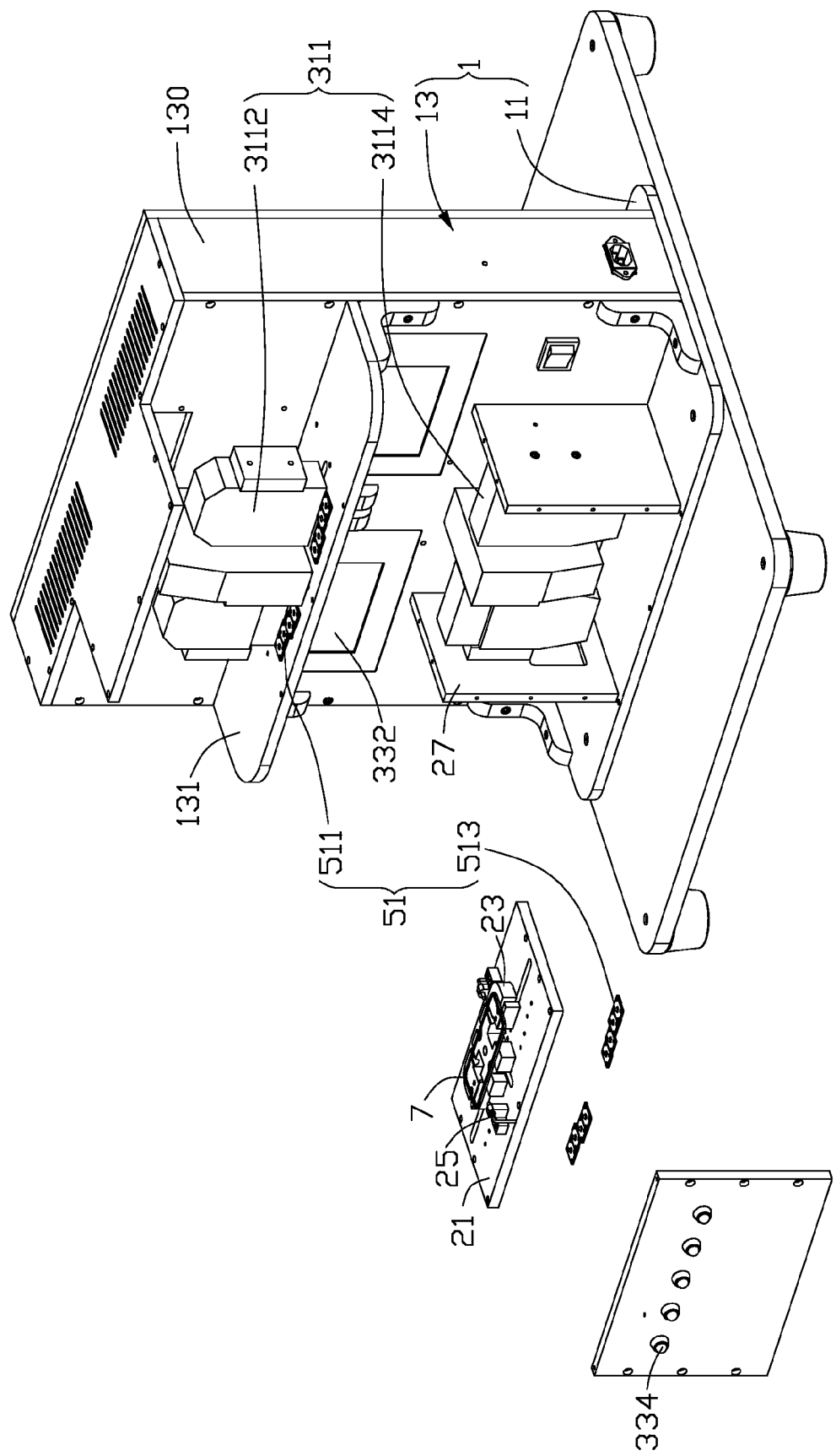
FIG. 2 is a disassembled view of the device shown in FIG. 1.
Figure 3:
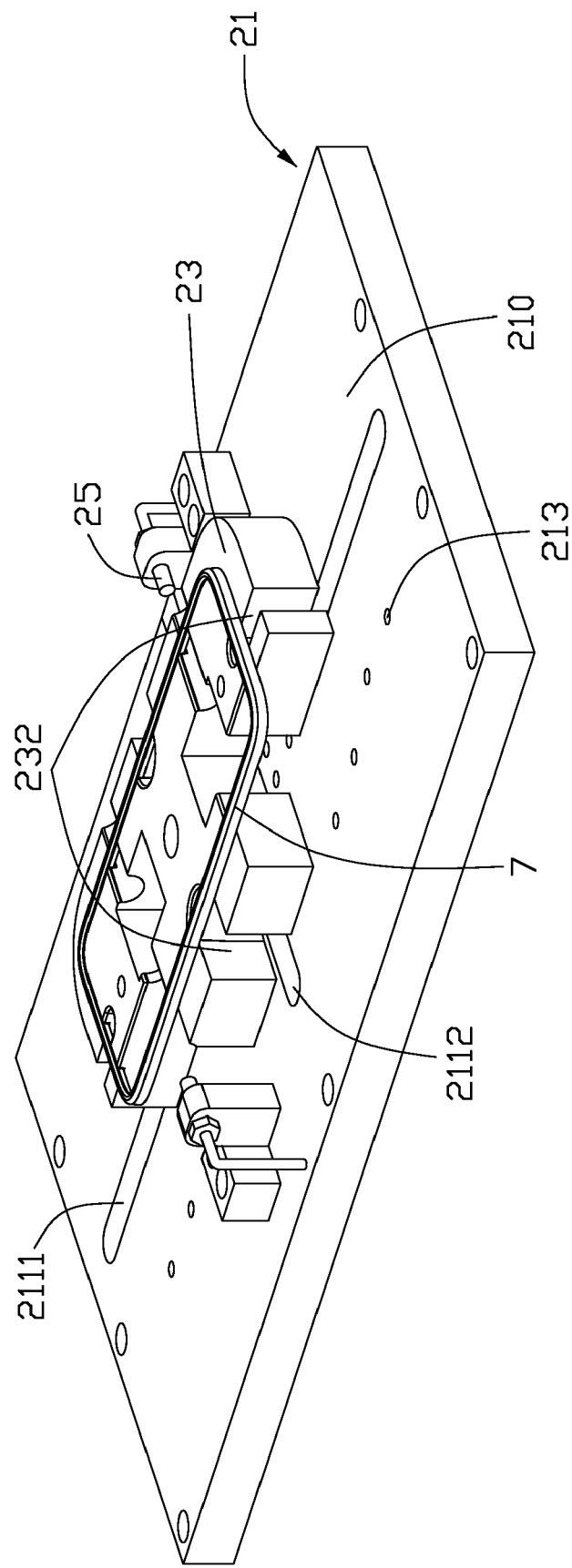
FIG. 3 is an enlarged view of a part of a locating apparatus of the device shown in FIG. 1.

Also referring to FIG. 2 and FIG. 3, the housing 1 includes a base 11 and a retaining mechanism 13 assembled on the base 11. The retaining mechanism 13 has a retaining box 130 mounted on the base 11 and a detecting board 131 assembled to a side of the retaining box 130, thus the detecting board 131 is positioned above and parallel to the base 11.

The locating apparatus 2 includes a locating board 21, a locating clamp 23, a pair of locating sensors 25 and a pair of pedestals 27. The pedestals 27 are assembled on the base 11 and positioned under the detecting board 131. The locating board 21 is positioned between the detecting board 131 and the pedestals 27. An undersurface of the locating board 21 is supported by the supporting pedestals 27, and a top surface of the locating board 21 defines a rectangular locating plane 210 towards the detecting board 131 thereon.

The locating board 21 also defines two length detecting apertures 2111, two width detecting apertures 2112 and a plurality of through holes 213 therein. The two length detecting apertures 2111 extend along a relative longer midline of the locating plane 210. The two width detecting apertures 2112 extends along a relative shorter midline of the locating plane 210, and thus perpendicularly to the length detecting apertures 2111. The length detecting apertures 2111 and the width detecting apertures 2112 all communicate through the top surface and the undersurface of the locating board 21. The through holes 213 are distantly disposed in the locating board 21 and communicating with the locating plane 210. The locating clamp 23 is mounted on a central portion of the locating plane 210 to hold workpieces. A plurality of grooves 232 corresponding to the length detecting apertures 2111 and width detecting apertures 2112 are defined in the locating clamp 23. The two locating sensors 25 are respectively mounted on two opposite corners of the locating clamp 23 and electronically connected to the main processor 4.

The determining apparatus 3 includes a detecting module 31, a first subsidiary processor 32 and a display module 33. The detecting module 31 includes three laser detectors 311 aligned in a straight line wherein each laser detector 311 includes a laser emitter 3112 mounted above the locating board 21 and a laser receiver 3114 corresponding to the laser emitter 3112 and mounted under the locating board 21 (shown schematically only). In assembly, the laser receivers 3114 are mounted on the base 11 and fixed between the pedestals 27. A middle laser emitter 3112 can emit a group of parallel laser beams disposed in a first beam plane and traveling through the grooves 232 and the width detecting apertures 2112 to be received by a middle laser receiver 3114, and two side laser emitters 3112 can emit a group of parallel laser beams disposed in a second beam plane perpendicular to the first beam plane and traveling through the grooves 232 and the length detecting apertures 2111 to be received by two sides laser receivers 3114. The first subsidiary processor 32 can be a microprocessor or a single chip, which is installed in the retaining box 130 and connected to the detecting module 31. The display module 33 is connected to the first subsidiary processor 32 and includes at least one display 332 and a plurality of indicator lights 334, wherein the display(s) 332 and the indicator lights 334 are all mounted on an outer surface of the retaining box 130.

The main processor 4 can be a computer, a microprocessor of a single chip connected to the locating sensors 25 and the first subsidiary processor 32. In assembly, the main processor 4 can be installed in the retaining box 130 or located outside. The main processor 4 stores a test program therein for determining if the dimensions of workpieces are in predetermined ranges.

The protecting apparatus 5 includes a plurality of infrared sensors 51 and a second subsidiary processor 53. Each infrared sensor 51 has an infrared emitter 511 and an infrared emitter 513. The infrared emitters 513 are respectively received in the through holes 213 of the locating board 21. The infrared emitters 511 are mounted on the detecting board 131 and respectively align with the infrared emitters 513. The second subsidiary processor 53 is installed in the retaining box 130 and connected to the infrared sensors 51 and the main processor 4.

Before the device 100 is used to measure a dimension of a workpiece 7, the workpiece 7 is put on the locating plane 210 and held by the locating clamp 23. The infrared emitters 511 automatically emit infrared rays to be received by respective infrared receivers 513, thereby detecting if there is any bearer (for example, hands or manipulators) conveying the workpiece 7 or other unwanted objects on the locating board 21. If there is an unwanted object on the locating board 21, the object will shield some infrared rays. Thus, the second subsidiary processor 53 can detect the object by the infrared sensors 51, and send protective instruction to the main processor 4. When receiving the protective instruction, the main processor 4 prohibits the locating apparatus 2 and the determining apparatus 3 to work, thereby preventing determining errors and decreasing power consuming. If the bearer has already been cleared off the locating board 21 and the workpiece 7, no infrared rays are shielded. Thus, the second subsidiary processor 53 can detect that the bearer has been off and an actuating instruction is sent to the main processor 4.

When receiving the actuating instruction, the main processor 4 first controls the locating sensors 25 to send optical signals to detect if the workpiece 7 is accurately held in a correct position by the locating clamp 23. If the workpiece 7 is held in an incorrect position, the locating sensors 25 send stop signals to the main processor 4, thus the main processor 4 stops the determining process temporarily. When the locating sensors 25 detect the workpiece 7 is in a correct position, they send actuating signals to the main processor 4, and thus the main processor 4 controls the determining apparatus 3 to work.

In determining, the main processor 4 sends instructions to the first subsidiary processor 32, then the first subsidiary processor 32 controls the laser emitters 3112 to emit laser beams. Some laser beams are shielded by the workpiece 7 and other laser beams travels through the grooves 232 and the detecting apertures 2111/2112 to be received by the laser receivers 3114. The first subsidiary processor 32 transfers the image signals formed by laser beams arriving at the laser receivers 3114 to the main processor 4. The main processor 4 determines the dimensions of the shielded parts on the laser receivers 3114 according to the image signals, and thus obtains the length and width of the workpiece 7. The main processor 4 can also process the data according to the stored test program to determine if a dimension of the workpiece 7 is in an acceptable range. The processing results can be displayed by the display(s) 332 and the indicator lights 334.

When the present device 100 determines a dimension of the workpiece 7, the workpiece 7 need not be contacted by any tools, thus a surface and shape of the workpiece 7 is protected. Furthermore, the device 100 measures a dimension of the workpiece 7 according to the shielded part of the laser beams, therefore, the laser beams reflected by the surface of the workpiece 7 cannot interfere with the determining precision.

Understandably, the number of the detecting apertures 2111/2112 and the shape of each detecting aperture 2111/2112 can also be changed. For example, the two length detecting aperture 2111 can communicate with each other and the two width detecting aperture 2112 can also communicate with each other, thereby forming a cross-shaped detecting aperture. Correspondingly, the number of the laser detectors 311 and the assembling manners can also be changed, so as laser beams emitted by the laser emitters 3111 can respecting travel through their corresponding detecting apertures 2111/2112. The number of the locating sensors 25 and the infrared sensors 51 can also be changed.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A device for determining dimensions of a workpiece, comprising:
   a locating apparatus including a locating board, the locating board for supporting a workpiece and defining at least one detecting aperture therethrough;
   a determining apparatus including a detecting module, the detecting module including at least one laser detector, each laser detector including a laser emitter and a laser receiver respectively mounted on two opposite sides of the locating board; and
   a main processor connected to the locating apparatus and the determining apparatus, wherein the laser emitter emits laser beams travelling through the detecting aperture and received by the laser receiver, and the main processor determining the dimension of the workpiece according to the dimension of parts of the laser receiver shielded by the workpiece.

2. The device as claimed in claim 1, wherein the locating board defines at least one length detecting aperture and at least one width detecting aperture extending perpendicularly to the length detecting aperture, the determining apparatus includes at least one laser emitter emitting laser beams travelling through the length detecting aperture to be received and at least one laser emitter emitting laser beams travelling through the width detecting aperture to be received.

3. The device as claimed in claim 1, wherein the locating board defines a locating plane on its top surface for supporting a workpiece.

4. The device as claimed in claim 1, wherein the locating apparatus includes a locating clamp mounted on its top surface to hold workpieces, and the locating clamp defines at least one groove corresponding to the detecting aperture therein to allow laser beams travelling through.

5. The device as claimed in claim 4, wherein the locating apparatus includes at least one locating sensor mounted on the locating clamp to detect if the workpieces are held in correct determining positions, such that the main processor stop the determining process when the locating sensor detects that a workpiece is in an incorrect position.

6. The device as claimed in claim 4, further comprising a housing, wherein the housing includes a base and a detecting board mounted above the base, and the locating board being mounted between the detecting board and the base.

7. The device as claimed in claim 6, wherein the laser emitter is mounted above the locating board and the laser receiver corresponding to the laser emitter is mounted under the locating board, so laser beams emitted from the laser emitter travel through the grooves and the detecting aperture to be received by the laser receiver.

8. The device as claimed in claim 6, further comprising a protecting apparatus for detecting unwanted objects on the locating board; the protecting apparatus including a plurality of infrared sensors, wherein each infrared sensor has an infrared emitter mounted on a top surface of the locating board and an infrared emitter mounted on the detecting board and align with the infrared emitter.

9. The device as claimed in claimed 8, wherein the protecting apparatus is connected to the main processor such that the main processor prohibits the locating apparatus and the determining apparatus to work when the protecting apparatus detects unwanted objects on the locating board.

10. The device as claimed in claim 6, wherein the determining apparatus includes a display module connected to the main processor and mounted on an outer surface of the housing to display determining results.

* * * * *

UNITED STATES PATENT AND TRADEMARK OFFICE
CERTIFICATE OF CORRECTION

PATENT NO. : 7,984,561 B2  
APPLICATION NO. : 12/399224  
DATED : July 26, 2011  
INVENTOR(S) : Lei Li et al.

Page 1 of 1

It is certified that error appears in the above-identified patent and that said Letters Patent is hereby corrected as shown below:

Please replace Item (73) regarding "Assignees" on the front page of the Patent with the following:

Item (73) Assignees: Shenzhen Futaihong Precision Industry Co., Ltd., Shenzhen, Guangdong Province (CN); FIH (Hong Kong) Limited, Kowloon (HK)

Signed and Sealed this  
Twenty-first Day of February, 2012

David J. Kappos  
*Director of the United States Patent and Trademark Office*